United States Patent [19]

Wedlake et al.

[11] Patent Number: 5,607,787
[45] Date of Patent: Mar. 4, 1997

[54] HIGH TEMPERATURE STORAGE BATTERY

[75] Inventors: Roger J. Wedlake, Mulbarton, South Africa; Roger J. Bones; David L. Segal, both of Abington, England

[73] Assignee: Programme 3 Patent Holdings, Luxembourg

[21] Appl. No.: 238,164

[22] Filed: May 3, 1994

[51] Int. Cl.$^6$ ............................................. H01M 10/50
[52] U.S. Cl. .......................... 429/62; 429/8; 429/120
[58] Field of Search .................................. 429/62, 61, 120, 429/26, 8, 49, 48, 176, 72

[56] References Cited

U.S. PATENT DOCUMENTS

| | | | |
|---|---|---|---|
| 3,837,918 | 9/1974 | Nakabayashi | 429/62 X |
| 4,184,007 | 1/1980 | Urry | 429/48 X |
| 4,206,272 | 6/1980 | Fischer et al. | 429/62 |
| 4,269,905 | 5/1981 | Wedlake et al. | 429/8 |
| 4,367,799 | 1/1983 | Tarpley, Jr. | 169/46 |
| 4,383,013 | 5/1983 | Bindin et al. | 429/104 X |
| 4,476,201 | 10/1984 | Repenning et al. | 429/62 |
| 4,497,879 | 2/1985 | Lucke et al. | 429/62 |
| 4,522,898 | 6/1985 | Esrom | 429/120 |
| 4,820,598 | 4/1989 | Descroix et al. | 429/62 |
| 5,387,793 | 1/1995 | Tiedemann et al. | 429/62 |

FOREIGN PATENT DOCUMENTS

| | | |
|---|---|---|
| 0065248 | 11/1982 | European Pat. Off. . |
| 1267255 | 6/1961 | France . |
| 2443747 | 7/1980 | France . |
| 2901975 | 7/1980 | Germany . |
| 54071900 | 6/1979 | Japan . |
| 3112569 | 5/1991 | Japan . |
| 4098768 | 3/1992 | Japan . |
| 4087266 | 3/1992 | Japan . |
| 4135574 | 5/1992 | Japan . |
| 4282573 | 7/1992 | Japan . |
| 4188570 | 8/1992 | Japan . |
| 4289677 | 10/1992 | Japan . |
| 4289676 | 10/1992 | Japan . |
| 4288169 | 10/1992 | Japan . |
| 4286874 | 10/1992 | Japan . |
| 4300563 | 10/1992 | Japan . |
| 4284371 | 10/1992 | Japan . |
| 4303466 | 10/1992 | Japan . |
| 5031207 | 2/1993 | Japan . |
| 5089908 | 4/1993 | Japan . |

OTHER PUBLICATIONS

"Fire Trace Automatic Fire Extinguisher", brochure, printed in 1992.
UK search report, dated May 7, 1994.

*Primary Examiner*—Anthony Skapars
*Attorney, Agent, or Firm*—Arnold, Wthite & Durkee

[57] ABSTRACT

A high temperature storage battery comprises a plurality of panels forming a housing defining a cell storage cavity, heat insulating material in or adjacent the panels, and a non-aqueous high temperature electrochemical cell within the cell storage cavity. It also includes holding means for holding a dispersable protective substance. The holding means is adapted to discharge protective substance into the cavity on the temperature in the cavity exceeding a predetermined temperature, and/or on rupturing thereof.

16 Claims, 1 Drawing Sheet

HIGH TEMPERATURE STORAGE BATTERY

THIS INVENTION relates to a high temperature storage battery. It relates also to a protected high temperature storage battery.

According to a first aspect of the invention, there is provided a high temperature storage battery, which comprises a plurality of panels forming a housing defining a cell storage cavity;

heat insulating material in or adjacent the panels;

at least one non-aqueous high temperature electrochemical cell within the cell storage cavity; and holding means for holding a dispersable protective substance, the holding means being adapted to discharge protective substance into the cavity on the temperature in the cavity exceeding a predetermined temperature, and/or on rupturing thereof.

According to a second aspect of the invention, there is provided a protected high temperature storage battery, which comprises a plurality of panels forming a housing defining a cell storage cavity;

heat insulating material in or adjacent the panels;

at least one non-aqueous high temperature electrochemical cell within the cell storage cavity;

holding means for holding a dispersable protective substance, the holding means being adapted to discharge protective substance into the cavity on the temperature in the cavity exceeding a predetermined temperature, and/or on rupturing thereof; and dispersable protective substance inside the holding means.

While the housing can, at least in principle, be of any desired shape, it will normally be square or rectangular in plan view.

The housing may thus have a floor panel, a top panel and a plurality of side panels arranged peripherally between the floor and top panel. Each panel may be of double walled construction, with the heat insulating material provided between the panel walls.

The battery may, optionally, include feed means for introducing cooling fluid into the cavity, and withdrawal means for withdrawing spent cooling fluid from the cavity.

A plurality of the electrochemical cells, arranged in modules or groups if desired, may be provided, with spaces or gaps being provided between adjacent cells or groups of cells. A normally empty space may be provided above the cells, as well as below the cells. The cooling fluid feed means, when present, may comprise a cooling fluid inlet leading into the upper space above the cells, ie between the cells and the top panel, while the cooling fluid withdrawal means can then comprise a cooling fluid outlet leading from the space below the cells, ie between the cells and the floor or bottom panel, with the gaps or spaces between the cells or groups of cells interconnecting the upper and lower spaces and permitting cooling fluid movement from the upper to the lower space, in use.

The electrochemical cells may be of a kind containing, at the operating temperature of the cells, an alkali metal in molten form. Thus, for example, the cells may be of the molten alkali metal/chalcogen type, comprising, in essence, a molten alkali metal electrode, a chalcogen electrode, and a solid electrolyte between the electrodes. Thus, the molten alkali metal is typically sodium, the chalcogen sulphur or a polysulphide, and the solid electrolyte beta alumina. Such a cell has an operating temperature in the region of 300–400° C.

Instead, however, the electrochemical cells may be of a kind comprising, at the operating temperature of the cell and when in its charged state, a molten alkali metal anode; a cathode or half-cell comprising an alkali metal aluminium halide molten salt electrolyte, an electronically conductive electrolyte-permeable matrix impregnated with the electrolyte; and a transition metal chloride dispersed in the matrix; and a separator separating the anode from the cathode. Typically, the alkali metal is sodium, the electrolyte sodium aluminium chloride ($NaAlCl_4$), the transition metal iron or nickel, and the separator beta alumina. The operating temperature of this cell is in the region of 250–400° C.

BRIEF DESCRIPTION OF THE DRAWING

In use, the battery will thus be at its operating temperature of 250–400° C. When the battery is provided with the cooling fluid feed and withdrawal means as hereinbefore described, its operating temperature will be regulated by passing a cooling fluid such as air through its storage cavity by means of the cooling fluid inlet, the empty spaces, and the cooling fluid outlet; however, the battery can also be of a kind not having cooling fluid feed and withdrawal means, with the operating temperature being determined by the cell type and construction, the battery construction, insulating material used, etc.

The holding means may comprise a conduit of a material capable of softening sufficiently at the predetermined temperature to rupture, with the conduit located inside the battery so that it is in the form of a rupturable internal conduit. The rupturable internal conduit may be located in the upper space and/or in the lower space. The rupturable internal conduit may span the space(s), and may be located against the top and/or against the floor panel. Thus, for example, the rupturable internal conduit may be arranged in zig-zag or similar fashion in the spaces. Thus, when the battery is at its operating temperature of 250–400° C., as hereinbefore described, it is protected by the conduit and the protective substance contained therein, with the conduit and protective substance thus constituting a protective system for the battery. Should the temperature of the battery rise to above the predetermined temperature, the material of the conduit will melt or at least soften sufficiently for the conduit to rupture, thereby causing the fire inhibiting substance to be released or dispersed into the upper and/or lower spaces and around the cells, thus providing protection by preventing or inhibiting escape of liquid sodium and other components from the cell(s) and the cavity, and/or by inhibiting entry of air or water into the cavity. Similarly, the protective substance will also be discharged from the conduit on rupturing of the conduit, which can occur if the housing is ruptured such as may occur, for example, if a vehicle carrying the battery is involved in an accident.

Figure 1:
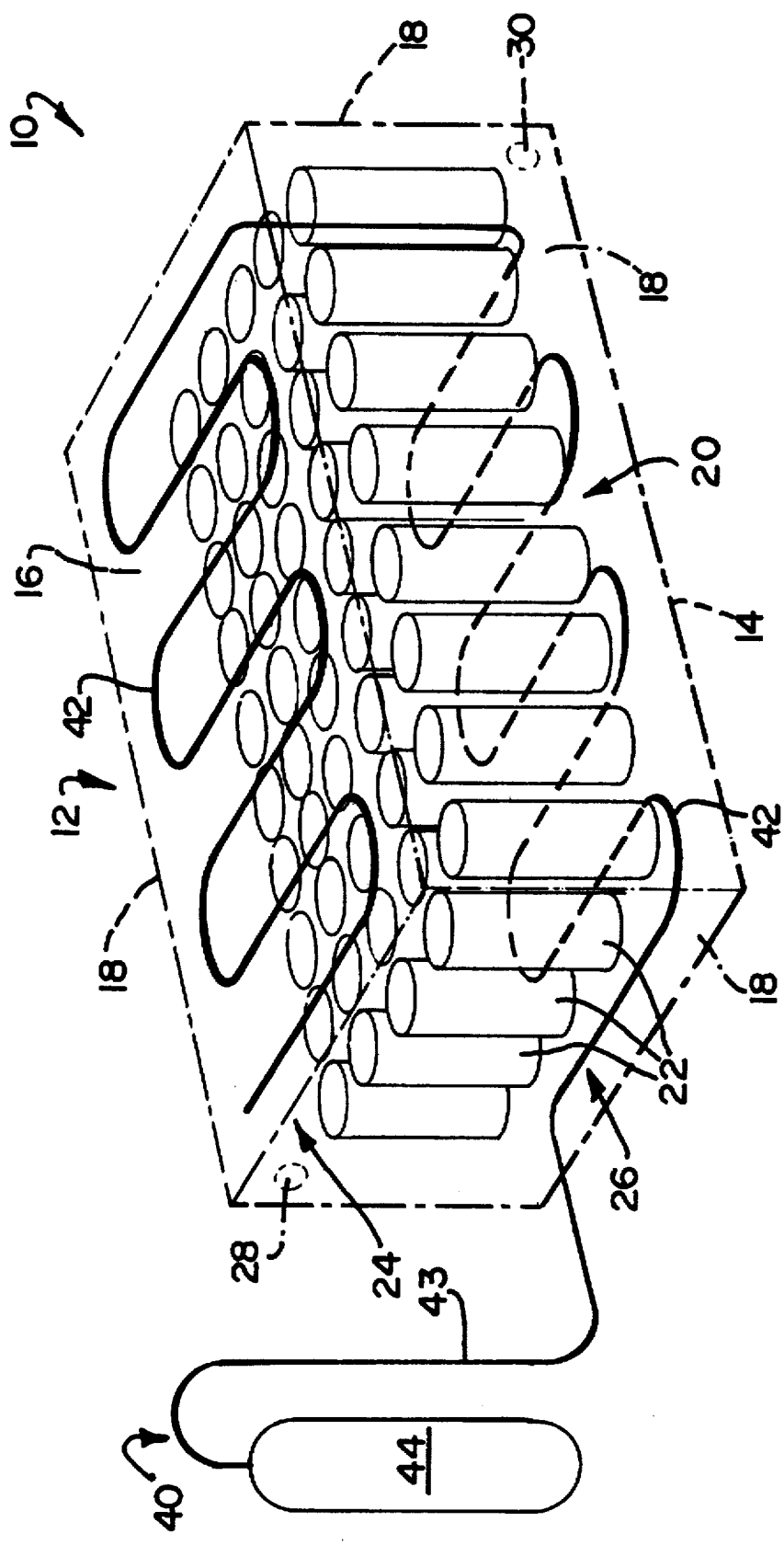

The rupturable conduit material may be aluminium which melts at about 660° C., and already softens and hence weakens at temperatures above 500° C. The predetermined temperature will thus be about 500° C.–600° C., and can be about 200° C. above the normal operating temperature. In a battery having a relatively low operating temperature so that the predetermined temperature is in the region of 300–350° C., the conduit material can be plastics or polymeric material so that the rupturable internal conduit is high temperature plastic pressure tubing. The plastic material will thus also be selected to rupture or soften at the predetermined temperature.

The dispersable protective substance may be held under pressure in the internal rupturable conduit. A pressurized reservoir containing a supply of the substance and located remotely from the battery may be provided, and an external conduit may operatively connect the rupturable internal conduit to the reservoir.

The dispersable protective substance may comprise an inorganic fire inhibiting or retarding substance. While the dispersible fire inhibiting or retarding substance can in principle be in any suitable dispersible form, the Applicant believes that a substance in liquid form or in the form of a liquid/solid mixture in the internal conduit, and which is capable of foaming or expanding on being released, thereby to seal off the cavity, will give good results. Furthermore, the substance may be such that the foam rigidifies or sets.

The substance may thus comprise a silica dispersion in admixture with a surfactant to enhance its foaming characteristics. The silica dispersion may be that obtained by dispersing silica powder in a suitable carrier. Instead, a silica dispersion admixed with sodium silicate solution, as a first component, and a calcium nitrate solution as a second separate component, can be used; two sets of the conduits and pressurized vessels will then be required. On release of both mixtures in such fashion that they admix, precipitation of calcium silicate takes place.

The mixture may be non-aqueous, and may then include at least one oxide selected from the group consisting of silica, alumina, titania and zirconia, as the inorganic fire inhibiting substance. Examples of such oxides are those obtainable under the trade mark AEROSOL from Degussa SA.

Instead, the mixture may be aqueous, and may then include, as the inorganic fire inhibiting substance, a compound selected from the group consisting of a silicate and a phosphate. An example of a suitable phosphate is that obtainable by mixing an aqueous alumina sol such as aluminium chlorohydrate, obtainable from Albright and Wilson, with a solution of phosphoric acid. Another example is aluminium phosphate.

The protective substance may include a sorbent micromolecular sieve material admixed with the other components. The sorbent micromolecular sieve material, when present, may be a dehydrated zeolite or a dehydrated tectosilicate, and may thus be as described in U.S. Pat. No. 4,269,905, which is hence incorporated herein by reference.

The protective substance may thus include a surfactant to enhance foaming. The surfactant may, for example, be a silicone fluid such as polydimethyl-siloxane when the dispersion is non-aqueous. When the dispersion is aqueous, the surfactant may be cationic, anionic or non-ionic, for example hexamethyl tetramethyl ammonium bromide, sodium dodecyl sulphate, or polyethylene glycol.

The protective substance may also include a propellent, such as an azide or a compressed inert gas, eg argon or nitrogen.

The invention will now be described by way of example with reference to FIG. 1. FIG. 1 shows a three-dimensional view of a protected high temperature storage battery.

In the drawing reference numeral 10 generally indicates a protected high temperature storage battery, in accordance with the invention.

The battery 10 includes a housing 12. The housing 12 is made up of a floor panel 14, an upper panel 16 spaced from the floor panel, and side panels 18 arranged peripherally between the panels 14, 16. Each of the panels is double-walled (not shown), with suitable heat insulating material, eg evacuated glass fibre mats, being provided between the walls. An electrochemical cell storage cavity 20 is defined between the panels 14, 16 and 18.

The battery 10 also includes a plurality, typically several hundreds, of electrochemical cells 22. The cells 22 are typically arranged in modules, and are of circular cylindrical form. The cells may be of the type, when they are fully charged and at their operating temperature of 300° C.–400° C., represented by molten sodium anode/beta alumina solid electrolyte/sulphur electrode. Instead, however, they may be of the type, at the same conditions, represented by sodium anode/beta alumina separator/electronically conductive electrolyte permeable matrix impregnated with sodium aluminium chloride electrolyte, and nickel chloride or iron chloride dispersed in the matrix.

The cells 22 are arranged such that there is an upper empty space 24 between the cells and the upper panel 16, as well as a lower empty space 26 between the cells 22 and the floor panel 14. Gaps or spaces (not shown) are provided between adjacent cells or groups or modules of cells, so that the spaces 24, 26 are in communication with each other by means of these gaps or spaces.

A cooling fluid inlet 28 leads through one of the side panels 18 into the upper space 24, while a cooling fluid outlet 30 leads from the space 26 through another of the side panels 18.

The battery 10 also includes a protective system, generally indicated by reference numeral 40. The protective system 40 comprises an internal aluminium conduit or tube 42 arranged in zig-zag fashion along the underside of the panel 16 as well as along the upper surface of the panel 14. The one end of the conduit 42 is closed off, while its other end extends through one of the side panels 18 and is connected to a suitable external tube or conduit 43 leading to a reservoir in the form of a pressurized cylinder 44 located externally to the housing 12, eg in the engine bay of a vehicle when the battery is used for vehicle propulsion and is located on the vehicle, eg in the engine bay or the vehicle trunk.

The pressurized cylinder 44 and tubes 42, 43 contain a fire retarding substance, as hereinafter described.

In use, the cells 22 will be at their operating temperature in the region of 300° C.–400° C., with this also being the operating temperature of the battery 10. On the temperature within the cavity 20 rising to above the softening point of aluminium, ie to between the aluminium softening point and its melting point of about 600° C.–660° C., the tube 42 will rupture under the pressure of the substance therein, thus allowing the fire retarding substance to escape and fill all voids within the cavity 20, ie the empty spaces 24, 26 and the gaps or spaces between the cells 22. The substance foams on being released from the conduit 42, as hereinafter described, and thereafter rigidifies to seal off the cavity 20.

An abnormal temperature rise as hereinbefore described can typically occur if a fire breaks out in the battery 10 as can occur, for example, as a result of abnormal cell failure, or extreme overcharging. For example, the battery 10 can be located in the engine bay of a vehicle, and the temperature rise could then occur, if the vehicle is involved in an accident, as a result of which cells are ruptured or squashed.

By means of the rigid foam blanket provided within the cavity 20, escape of molten sodium from the cavity 20 is thus prevented. Should liquid sodium escape from the battery 10, it will ignite spontaneously in the presence of air at temperatures in excess of 300° C. thus aggravating any fire condition existing outside the battery. Furthermore, the rigid foam blanket will restrict entry of air and water, eg from a fireman's hose, into the cavity 20.

However, the protective substance will also escape and fill the spaces and gaps as hereinbefore described, if the housing 12 and tubing 42 are subjected to rupturing, eg pierced by a sharp object, which may occur if a vehicle fitted with the battery is involved in an accident.

In one embodiment, the dispersable fire retarding substance may be a colloidal dispersion or sol of silica prepared by dispersing a flame hydrolysed silica powder, such as that available under the trade mark AEROSIL OX50 from Degussa AG, in an evaporable carrier liquid such as 1:1:1 trichloroethane available under the trade mark GENKLENE from ICI PLC, at an oxide concentration of about 150 g/l. A foaming agent such as silicone fluid available from Dow Corning Limited, is dissolved in the sol at a concentration of about 0,5 w/o, ie 0.5 g of foaming agent to 100 g of total oxide present in the sol, to produce the fire retarding substance. This substance or composition can be contained within the vessel 44 and aluminium tubing 42 under pressure, typically a pressure of about 5 bar by means of a compressed inert gas such as argon or nitrogen. On rupturing of the tubing 42 as hereinbefore described, a non-aqueous silica containing foam is released into the cavity 20 on evaporation of the carrier liquid at the elevated temperatures of the battery, a rigid or ceramic protective foam structure is obtained.

Instead, in another embodiment of the invention, two protective systems each comprising a pressurized cylinder 44, with its own tubes 42, 43 can be provided. Into the one system is introduced a mixture of an aqueous silica sol, such as that available under the trade mark SYTON X30 from Monsanto Company, and containing 366 g/l oxide, and a sodium silicate solution (such as that obtainable under the trade mark FLUKA) in such proportions that 50 w/o of the silica content is contributed by the silica sol, together with a foaming agent such as silicone-glycol copolymer available under the trade name DC193 from Dow Corning Limited. The foaming agent is present in a concentration of about 0,5 mass % of total oxide. Into the other system is introduced a solution of calcium nitrate also containing DC193 foaming agent. Each system is kept under a pressure of about 5 bar by means of a compressed inert gas such as argon or nitrogen. On rupturing of the aluminium conduits 42 as hereinbefore described, each mixture is ejected under pressure, with intimate mixing of the two liquid components thereof occurring in the cavity 20. On intimate mixing, precipitation of calcium silicate in a foam occurs. A rigid or ceramic foam is produced as soon as the water content in the foam decreases sufficiently due to evaporation which takes place at the elevated temperature of the battery.

Another example of a non-aqueous high temperature cell which can be used is that having, at the operating temperature of the cell and when charged, a lithium anode, an iron sulphide cathode, and a lithium chloride/potassium chloride type electrolyte, which melts at about 450° C. Another example of a non-aqueous high temperature cell which can be used is a cell similar to that hereinbefore described but having a lower melting point electrolyte, eg an electrolyte having a melting point of about 200° C., so that tubing 42 of plastics instead of aluminium, can be used.

We claim:

1. A high temperature storage battery, which comprises a housing having a floor panel, a top panel and a plurality of side panels arranged peripherally between the floor and top panel, with each panel being of double walled construction and with the housing defining a cell storage cavity;

heat insulating material between the panel walls;

a plurality of non-aqueous high temperature electrochemical cells within the cell storage cavity, with spaces being provided between adjacent cells or groups of cells and the cells being operable at an elevated operating temperature;

an upper space between the cells and the top panel;

a lower space between the cells and the floor panel;

a cooling fluid feeder comprising a cooling fluid inlet leading into the upper space;

a cooling fluid withdrawer comprising a cooling fluid outlet leading from the lower space, with the spaces between the cells or groups of cells interconnecting the upper and lower spaces and permitting cooling fluid movement from the upper to the lower space; and a holder for holding a dispersable protective substance, the holder located in at least one of the spaces so that it spans the space, and being of a material capable of softening sufficiently at a temperature above the operating temperature of the cells so as to rupture, thereby to discharge protective substance into the cell storage cavity.

2. A battery according to claim 1, wherein the holder comprises a conduit located against the top panel and/or against the floor panel.

3. A battery according to claim 2, wherein the conduit material is aluminium which melts at about 660° C., and already softens and hence weakens at temperatures above 500° C.

4. A battery according to claim 2, wherein the conduit material is plastics or polymeric material so that the conduit is high temperature plastic pressure tubing.

5. A battery according to claim 2, which includes a pressurizable container for containing a supply of dispersable protective substance and located remotely from the battery, with an external conduit operatively connecting the conduit inside the housing to the reservoir.

6. A high temperature storage battery, which comprises a housing having a floor panel, a top panel and a plurality of side panels arranged peripherally between the floor and top panel, with each panel being of double walled construction and with the housing defining a cell storage cavity;

heat insulating material between the panel walls;

a plurality of non-aqueous high temperature electrochemical cells within the cell storage cavity, with spaces being provided between adjacent cells or groups of cells and the cells being operable at an elevated operating temperature;

an upper space between the cells and the top panel;

a lower space between the cells and the floor panel;

a cooling fluid feeder comprising a cooling fluid inlet leading into the upper space;

a cooling fluid withdrawer comprising a cooling fluid outlet leading from the lower space, with the spaces between the cells or groups of cells interconnecting the upper and lower spaces and permitting cooling fluid movement from the upper to the lower space;

a holder for holding a dispersable protective substance, the holder located in at least one of the spaces so that it spans the space, and being of a material capable of softening sufficiently at a temperature above the operating temperature of the cells so as to rupture, thereby to discharge protective substance into the cell storage cavity; and dispersable protective substance inside the holder.

7. A protected battery according to claim 6, wherein the holder comprises a conduit located against the top panel and/or against the floor panel.

8. A protected battery according to claim 6, wherein the conduit material is aluminium which melts at about 660° C., and already softens and hence weakens at temperatures above 500° C.

9. A protected battery according to claim 7, wherein the conduit material is plastics or polymeric material so that the conduit is high temperature plastic pressure tubing.

10. A protected battery according to claim 7, wherein the dispersable protective substance is held under pressure in the conduit inside the housing, with a pressurized reservoir containing a supply of the substance and located remotely from the battery being provided, and with an external conduit operatively connecting the conduit inside the housing to the reservoir.

11. A protected battery according to claim 7, wherein the dispersable protective substance comprises an inorganic fire inhibiting substance and is in the form of a liquid/solid mixture in the conduit inside the housing, the mixture being capable of foaming on being released and thereafter setting, thereby to seal off the cavity.

12. A protected battery according to claim 11, wherein the substance comprises a silica dispersion in admixture with a surfactant to enhance its foaming characteristics.

13. A protected battery according to claim 11, wherein the mixture is non-aqueous and includes at least one oxide selected from the group consisting of silica, alumina, titania and zirconia, as the inorganic fire inhibiting substance.

14. A protected battery according to claim 11, wherein the mixture is aqueous, and includes, as the inorganic fire inhibiting substance, a compound selected from the group consisting of a silicate and a phosphate.

15. A protected battery according to claim 13, wherein the protective substance includes a sorbent micromolecular sieve material admixed With the other components.

16. A protected battery according to claim 13, wherein the protective substance includes a surfactant to enhance foaming, as well as a propellant.

* * * * *

UNITED STATES PATENT AND TRADEMARK OFFICE
CERTIFICATE OF CORRECTION

PATENT NO.     :   5,607,787

DATED          :   March 4, 1997

INVENTOR(S)    :   Roger J. Wedlake, Roger J. Bones and David L. Segal

It is certified that error appears in the above-identified patent and that said Letters Patent is hereby corrected as shown below:

In claim 8, column 7, line 4, delete [6] and insert therefor --7--.

Signed and Sealed this

Twenty-seventh Day of May, 1997

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO.    : 5,607,787

DATED         : March 4, 1997

INVENTOR(S)   : Roger J. Wedlake, Roger J. Bones and David L. Segal

It is certified that error appears in the above-identified patent and that said Letters Patent is hereby corrected as shown below:

On the title page insert:

-- [30]   Foreign Application Priority Data
          May 4, 1993   [GB]   United Kingdom.....................9309116.3 --.

Signed and Sealed this

Twenty-second Day of July, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,607,787

DATED : March 4, 1997

INVENTOR(S) : Roger J. Wedlake, Roger J. Bones and David L. Segal

It is certified that error appears in the above-identified patent and that said Letters Patent is hereby corrected as shown below:

Title page, item [75], third line, delete "Abington" and insert --Abingdon-- therefor.

Signed and Sealed this

Second Day of December, 1997

*Attest:*

BRUCE LEHMAN

*Attesting Officer*      *Commissioner of Patents and Trademarks*